Patented Nov. 30, 1943

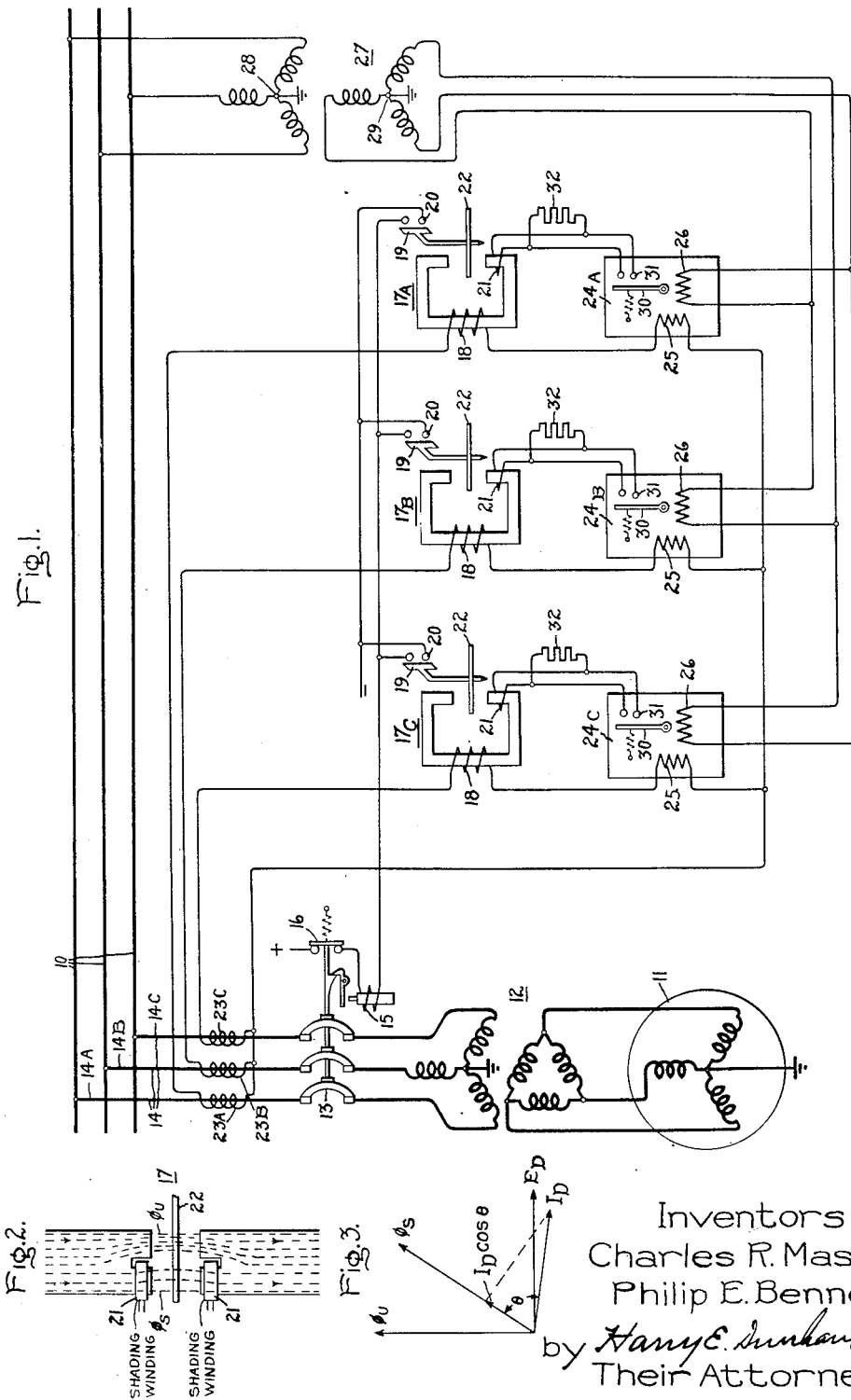

2,335,683

UNITED STATES PATENT OFFICE 2,335,683

PROTECTIVE ARRANGEMENT

Charles R. Mason, Charlton, and Philip E. Benner, Schenectady, N. Y., assignors to General Electric Company, a corporation of New York Application May 5, 1941, Serial No. 391,850

2 Claims. (Cl. 175—294)

Our invention relates to improvements in protective arrangements for electric systems.

In many applications, it is desirable to get sensitive overcurrent protection for one direction of power flow and less sensitive overcurrent protection for the other direction of power flow. In unit substations particularly, a source of power is usually connected through a transformer and circuit breaker to a bus connected to the network and, for current flow from the source to the bus, it is desirable to have rather insensitive overload current protection while, for current flow in the other direction, namely from the network through the bus and to the source, it is essential to have very sensitive overcurrent protection. Various arrangements have been proposed for solving this problem which usually required a plurality of overcurrent relays for each phase of the circuit involved as well as additional directional relays. It would be desirable to provide an arrangement which required only a single overcurrent relay and a single directional relay per phase which would give less sensitive overcurrent protection for one direction of power flow than for the other direction of power flow.

Accordingly, it is an object of our invention to provide a new and improved protective arrangement for an electric system which will provide sensitive overcurrent protection for one direction of power flow and less sensitive overcurrent protection for the other direction of power flow.

It is another object of our invention to provide a new and improved protective system comprising an overcurrent and a directional unit in which the inherent sensitivity of the overcurrent unit is varied in accordance with the contact position of the directional unit.

Further objects and advantages of our invention will become apparent as the following description proceeds and the features of novelty which characterize our invention will be pointed out with particularity in the claims annexed to and forming a part of this specification.

For a better understanding of our invention, reference may be had to the accompanying drawing in which Fig. 1 thereof diagrammatically illustrates an embodiment of our invention, Fig. 2 is a detailed view of a portion of the apparatus shown in Fig. 1, and Fig. 3 is a vector diagram to aid in the understanding of our invention.

Referring now to Fig. 1 of the drawing, we have illustrated our invention as specifically applied to an electric system including a polyphase circuit 10 which is supplied with electrical energy from a source 11, generally indicated as a Y-connected generator, through a power transformer 12, circuit-interrupting means 13, and a polyphase feeder circuit 14 including phase conductors 14A, 14B, and 14C. It will be understood that polyphase circuit 10 includes a complete electrical network or the like as is well understood by those skilled in the art. The circuit-interrupting means 13 is illustrated as a latched closed circuit breaker having a trip coil 15 and an $a$ switch 16 which is closed when the circuit breaker is closed and open when the circuit breaker is open.

In order to give the desired overcurrent protection for feeder circuit 14, we provide a plurality of overcurrent relays generally indicated at 17. One of these relays is provided for each phase conductor 14A, 14B, and 14C of the polyphase feeder circuit 14 and, to distinguish between the respective phases, we have designated these overcurrent relays as 17A, 17B, and 17C, respectively. We have indicated overcurrent relays 17 schematically as of the shaded pole induction-disk type, each provided with an energizing winding 18 and a contact-controlling member 19 for bridging parallel connected contacts 20 connected in series with trip coil 15 so that bridging of any one of the sets of contacts 20 by contact-controlling member 19 will cause tripping of circuit breaker 13. Each of the overcurrent relays 17A, 17B, and 17C is provided with a pair of shading coils or windings 21, only one of which is shown for each unit in Fig. 1 in order to simplify the drawing. However, the details of the pole structure between which the induction disk 22 is adapted to rotate including the two shading windings 21 are clearly shown in Fig. 2.

In order to energize the windings 18 of overcurrent relays 17A, 17B, and 17C, respectively, in response to the current flowing in feeder circuit 14, we provide a plurality of current transformers having secondary windings 23A, 23B, and 23C arranged in Y relationship and connected so as to energize the windings 18 of relays 17A, 17B, and 17C, respectively.

For purposes which will be brought out in greater detail hereinafter, we provide a plurality of power-directional relays 24 specifically indicated as 24A, 24B, and 24C in Fig. 1. Each of these power-directional relays is provided with a current winding 25 and a potential winding 26. The current windings 25 are connected in series with the windings 18 of relays 17A, 17B, and 17C, respectively, so as to be energized from the secondary windings 23A, 23B, and 23C, of the current transformers associated with feeder circuit 14. The potential windings 26, on the other hand, are energized from the electric circuit 10 through a potential transformer 27 having a primary winding 28 and a secondary winding 29. As indicated in Fig. 1, the power-directional relays are energized in the conventional quadrature manner well known to those skilled in the art. Each of the power-directional relays 24A, 24B, and 24C, is also provided with a contact-controlling member 30 for bridging associated contacts 31.

It will be understood by those skilled in the art that power normally flows from source 11 through feeder circuit 14 to the polyphase circuit 10 and, under these conditions of current flow, it is not desirable to interrupt the current flowing in this circuit unless it reaches an abnormally high value. Therefore, an overcurrent relay for protecting this circuit should be relatively insensitive so as not to cause tripping of circuit breaker 13 on normal overload conditions. If, however, current flows from polyphase circuit 10 toward source 11, it is desirable to operate circuit breaker 13 even though this current is considerably below the normal load current and, consequently, very sensitive overcurrent protection is desired for power flow in this direction. In order to accomplish this, we have arranged the contacts 31 of the power-directional relays in the circuit of the shading coils 21 of the associated overcurrent relays 17A, 17B, and 17C, respectively. Whenever power flow is from polyphase circuit 10 toward source 11, the power-directional relays 24A, 24B, and 24C will cause contacts 31 thereof to be bridged by contact-controlling members 30 thereby providing maximum sensitivity of overcurrent relays 17A, 17B, and 17C as will be described in greater detail hereinafter.

We have provided a suitable impedance 32 for shunting the contacts 31 in each of the shading coil circuits of overcurrent relays 17A, 17B, and 17C, respectively. Preferably, this impedance should be a resistance and, as will be understood by those skilled in the art, may be adjustable. For power flowing from source 11 to polyphase circuit 10, contacts 31 of the power-directional relays are opened and the shading coil circuits of overcurrent relays 17 are completed through impedances 32.

The operation of the protective system illustrated in Fig. 1 can best be understood by reference to Figs. 2 and 3. In Fig. 2, we have schematically illustrated the fluxes existing in the shaded pole induction type relays 17 and, as will be understood by those skilled in the art, the shading windings 21 cause the flux linked by these windings to lag the flux in the other portion of the pole, thereby causing a sweeping of the flux across the air gap between the poles so as to induce eddy currents in the induction disk 22. The reaction of the induced currents with the flux through the shaded portion of the poles produces a torque to cause operation of contact-controlling members 19.

It will be understood by those skilled in the art that the shaded flux also produces eddy currents which react with the unshaded flux to produce additional torque. In the vector diagram in Fig. 3, we have only considered a portion of the torque produced for the sake of simplicity since it illustrates the theory involved. As shown in Fig. 2, the flux through the unshaded portion is indicated as $\phi_U$, while, in the shaded portion, it is indicated as $\phi_S$. The flux $\phi_U$ in the unshaded portion of the poles induces a voltage in disk 22 in quadrature with it as indicated by $E_D$ in Fig. 3 and this voltage produces an eddy current $I_D$ lagging the voltage by a small angle. The torque of the shaded-pole induction type of relay is proportional to the product of the shaded flux and the component of the current $I_D$ in phase with this flux $\phi_S$ which may be expressed by the well-known equation $$T = K\phi_S I_D \cos \theta$$

where T is the torque, K is a constant, and $\theta$ is the angle between the flux $\phi_S$ and the current $I_D$. It is obvious from the above equation and from Fig. 3 that the greater the angle of lag between $\phi_S$ and $\phi_U$ up to ninety degrees, the greater will be the component of $I_D$ in phase with $\phi_S$ and, therefore, the greater will be the torque. The angle between $\phi_U$ and $\phi_S$ will theoretically be ninety degrees if the resistance of the shading coil circuit is zero and the greater the resistance of the shading coil circuit, the less the angle between $\phi_U$ and $\phi_S$. Accordingly, for the particular arrangement disclosed in Fig. 1, when one of the contact-controlling members 30 of power-directional relays 24 bridges its associated contacts 31 connected in series with the shading windings 21 of one of the overcurrent relays 17 to short circuit the respective impedance 32, this overcurrent relay will have maximum sensitivity. When contacts 31 are open, on the other hand, the impedances 32, which may be adjusted to suit the desired sensitivity, are inserted in the circuit of the shading coils 21 so as to reduce the sensitivity of overcurrent relays 17.

From the above discussion, it will be observed that, by means of a single overcurrent relay and a single directional relay per phase of the polyphase circuit to be protected, we have provided sensitive overcurrent protection for one direction of current flow and less sensitive overcurrent protection for the other direction of current flow.

While we have illustrated and described a particular embodiment of our invention, it will be understood that modifications thereof will occur to those skilled in the art. We desire it to be understood, therefore, that our invention is not limited to the particular arrangements disclosed and we intend in the appended claims to cover all modifications and changes which fall within the true spirit and scope of our invention.

What we claim as new and desire to secure by Letters Patent of the United States is:

1. In combination with an alternating current circuit, protective system comprising an overcurrent relay of the shaded pole induction disk type for opening said circuit, a shading coil on said relay, an impedance connected in closed circuit with said shading coil, and power directional responsive means adapted to change the effective value of said impedance in said closed circuit, said relay having one inherent operating characteristic for one effective value of said impedance and having a different inherent operating characteristic for another effective value of said impedance.

2. In combination with an alternating current circuit, a protective system for said circuit comprising an overcurrent relay having a different degree of sensitivity for different directions of power flow, said relay being of the shaded pole induction disk type including a current coil connected to said circuit and a shaded pole winding, an impedance connected in closed circuit with said shaded pole winding, and means operated in response to the direction of power flow in said circuit to short-circuit said impedance only when the power flow in said circuit is in a predetermined direction for changing the inherent torque response of said relay for a given current in said current coil.

CHARLES R. MASON.
PHILIP E. BENNER.